United States Patent [19]

Fernandez et al.

[11] Patent Number: 5,740,532
[45] Date of Patent: Apr. 14, 1998

[54] METHOD OF TRANSMITTING EMERGENCY MESSAGES IN A RF COMMUNICATION SYSTEM

[75] Inventors: Juan C. Fernandez; Kenneth S. Lerner, both of Boca Raton, Fla.

[73] Assignee: Motorola, Inc., Schaumburg, Ill.

[21] Appl. No.: 643,688

[22] Filed: May 6, 1996

[51] Int. Cl.$^6$ ........................................ H04B 7/00
[52] U.S. Cl. .................. 455/404; 455/38.2; 455/521
[58] Field of Search ........................... 455/33.1, 38.1, 455/38.2, 53.1, 54.2, 56.1, 58.1, 58.2, 67.1, 404, 31.1, 31.2, 31.3; 340/825.44; 379/57, 58

[56] References Cited

U.S. PATENT DOCUMENTS 5,548,583  8/1996  Bustamante .......................... 455/38.2

FOREIGN PATENT DOCUMENTS 3-62745  3/1991  Japan .................................. 455/38.2

Primary Examiner—Amelia Au
Attorney, Agent, or Firm—John H. Moore

[57] ABSTRACT

A method for an RF base station (105) to transmit an emergency message to a selective call receiver (104). The base station (105) receives incoming messages that are to be transmitted to selective call receivers, some of which incoming messages are emergency messages that include an emergency code, such as "911". The base station (105) creates a shortened emergency message by removing the emergency code from an incoming emergency message, and sends the shortened emergency message to a selective call receiver (104), along with an alert instruction for actuating a priority alert in the selective call receiver (104).

7 Claims, 4 Drawing Sheets

METHOD OF TRANSMITTING EMERGENCY MESSAGES IN A RF COMMUNICATION SYSTEM

FIELD OF THE INVENTION

This invention is generally directed to the field of RF (Radio Frequency) messaging systems, and particularly to techniques for sending emergency messages to selective call receivers that are located within the coverage area of an RF messaging system.

BACKGROUND OF THE INVENTION

In a typical RF messaging system, a person who desires to send a message to another person's selective call receiver places a telephone call to an appropriate messaging service. The messaging service usually provides an automatic prompt that directs the caller to enter two pieces of information: a "pin" number which identifies the targeted selective call receiver, and a telephone number which is to be transmitted to the selective call receiver. If the selective call receiver is capable of displaying an alphanumeric message, the caller may be prompted to enter alphanumeric text. In either case, the caller's message is transmitted to the targeted selective call receiver which, upon receipt of the message, alerts the user of the selective call receiver that a message has been received.

There are situations in which a caller desires to send an emergency message to a particular selective call receiver. In the typical messaging system, the caller is not able to indicate that his message is of an emergency nature except by including, in the text of the message, information that signifies to the user of the selective call receiver that the message is an emergency. A popular way of indicating that a message is an emergency message is to include an emergency code, such as "911", in the message. For example, a numeric message might have the form: 321-6880 911. An alpha-numeric message would have "911" appended to, or included within, the text of the message. Upon receipt and display of such a message, the selective call receiver user recognizes "911" as an emergency code and understands that the accompanying message is of an emergency nature.

There are two problems with this technique for sending emergency messages. The first problem is that the messaging system is required to transmit the additional data that represents the emergency code. Consequently, the messaging system's channel capacity is decreased.

The second problem is that the selective call receiver user is typically not given a distinctive alert to indicate that he has received an emergency message. The fact that an emergency message has been received will become apparent only when the user reads the message.

DESCRIPTION OF THE PREFERRED EMBODIMENT

Figure 1:
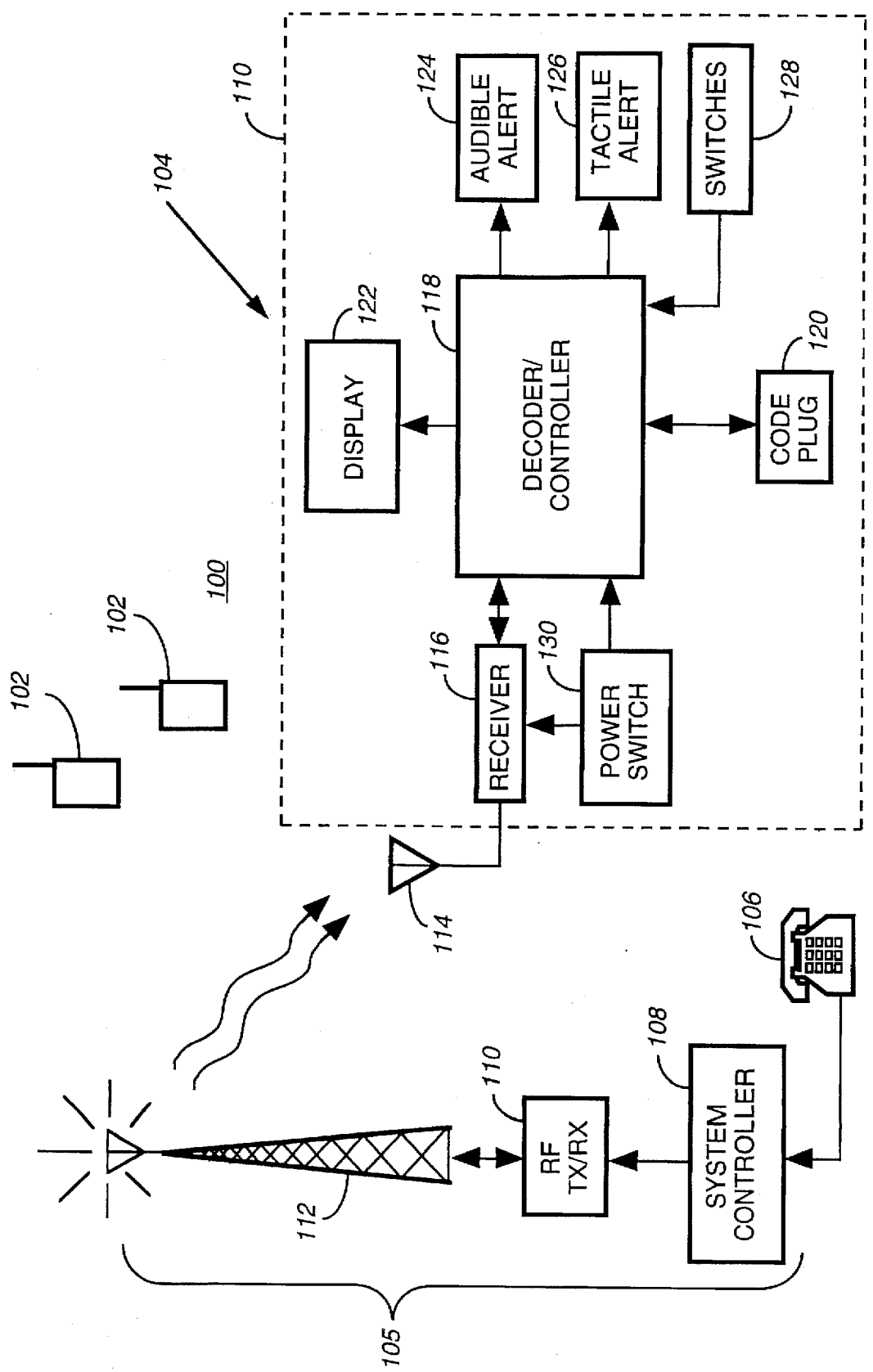
FIG. 1 illustrates an exemplary RF communication system with which the invention is advantageously used, including a block diagram of a selective call receiver that receives messages in the system.

Referring to FIG. 1, an RF communication system 100 is shown in which selective call receivers 102, 104 receive emergency and non-emergency messages. In the discussion herein, the selective call receivers are shown as pagers and the transmission of messages is illustrated as using a paging protocol. However, the invention may be used with other forms of addressable receivers which use different protocols.

A message typically originates by a sender using a telephone 106 to transmit, to a base station, the identity of a targeted selective call receiver and a message for the targeted selective call receiver. The base station formats the message according to the protocol being used and transmits it to the targeted selective call receiver.

In the illustrated embodiment, such a base station 105 includes a system controller 108, an RF transmitter/receiver 110, and an antenna 112. The system controller 108 generates the signal, including an address for the targeted selected call receiver, which is modulated onto an RF carrier by transmitter 110 and coupled to the antenna 112 for transmission.

The selective call receiver 104 is conventional. It receives signals at its antenna 114 and couples the received signals to a receiver 116 where they are filtered, amplified and demodulated.

A decoder/controller 118 receives information demodulated by the receiver 116 and compares the incoming address to an address stored in a code plug 120. If a match is found, the decoder/controller 118 decodes the accompanying message and causes the message to be displayed on a display 122. In addition, an audible alert or a tactical alert may be generated by an audible alert generator 124 and a tactile alert generator 126. The mode of operation of the pager is controlled by switches 128 which are manipulated by the user of the selective call receiver.

A power switch 130 is responsive to the decoder/controller 118 for turning the receiver on and off so as to conserve battery life.

Referring to the code plug 120, it stores data which determines which of various optional functions the selective call receiver is capable of executing. For example, the code plug 120 is preferably and conventionally programmed to cause the selective call receiver 104 to operate in a priority mode. In this priority mode, the decoder/controller 118 decodes certain data that accompanies an incoming message so as to signify to the user of the selective call receiver that the incoming message is a priority message. When such a priority message is decoded, the decoder/controller 118 causes the audible alert generator 124 to generate a distinctive sound which differs from the sound which is generated when a non-emergency message is decoded.

In the base station 105, the system controller 108 is programmed in a conventional manner to know which selective call receivers have a code plug that is programmed to allow the selective call receiver to operate in the priority mode described above. For this purpose, the system controller 108 may include a look-up table that identifies each selective call receiver that is capable of operating in the priority mode.

The foregoing describes conventional hardware and operation of the communication system 100. As discussed earlier, a sender who wishes to conventionally send an emergency or urgent message in such a system has been typically doing so by appending an emergency code (such as "911") to a message that is entered via the telephone 106. In conventional operation, the emergency code becomes encoded as part of the message that is transmitted by the base station 105. The targeted selective call receiver displays the received message on the display 122. However, the selective call receiver's decoder/controller 118 does not automatically signify that such a message is priority because the originator of the message was unable to identify the message as priority in a way that could be understood by the decoder/controller.

The invention provides a method of transmitting emergency or urgent messages and causing the targeted selective call receiver to alert its user of such a message, but without using transmission time to transmit the emergency code. The emergency code (e.g., 911) that the originator appends to his message is neither encoded nor transmitted by the base station 105.

According to the invention, the base station 105 receives incoming messages that are to be transmitted to selective call receivers, as from the telephone 106. Some of those incoming messages will be emergency or urgent messages that include an emergency code. The base station 105 scans the incoming messages to detect the presence of an emergency code. In a message where an emergency code is found (an emergency message), the base station 105 removes the emergency code to provide what is referred to herein as a shortened emergency message, i.e., the original message minus the emergency code. The base station 105 then transmits the shortened emergency message to the targeted selective call receiver, along with alert instructions for activating a priority alert in the targeted selective call receiver.

As discussed above, the selective call receiver's code plug 118 contains information that causes the decoder/controller 118 to generate a priority alert for any received message that is accompanied by alert instructions. Thus, when the shortened emergency messages are received with the alert instructions, the decoder/controller causes the display 122 to display the shortened emergency message, and the audible alert generator 124 (and/or the tactile alert generator 126) to generate a distinctive alert signifying the receipt of an emergency message.

Figure 2:
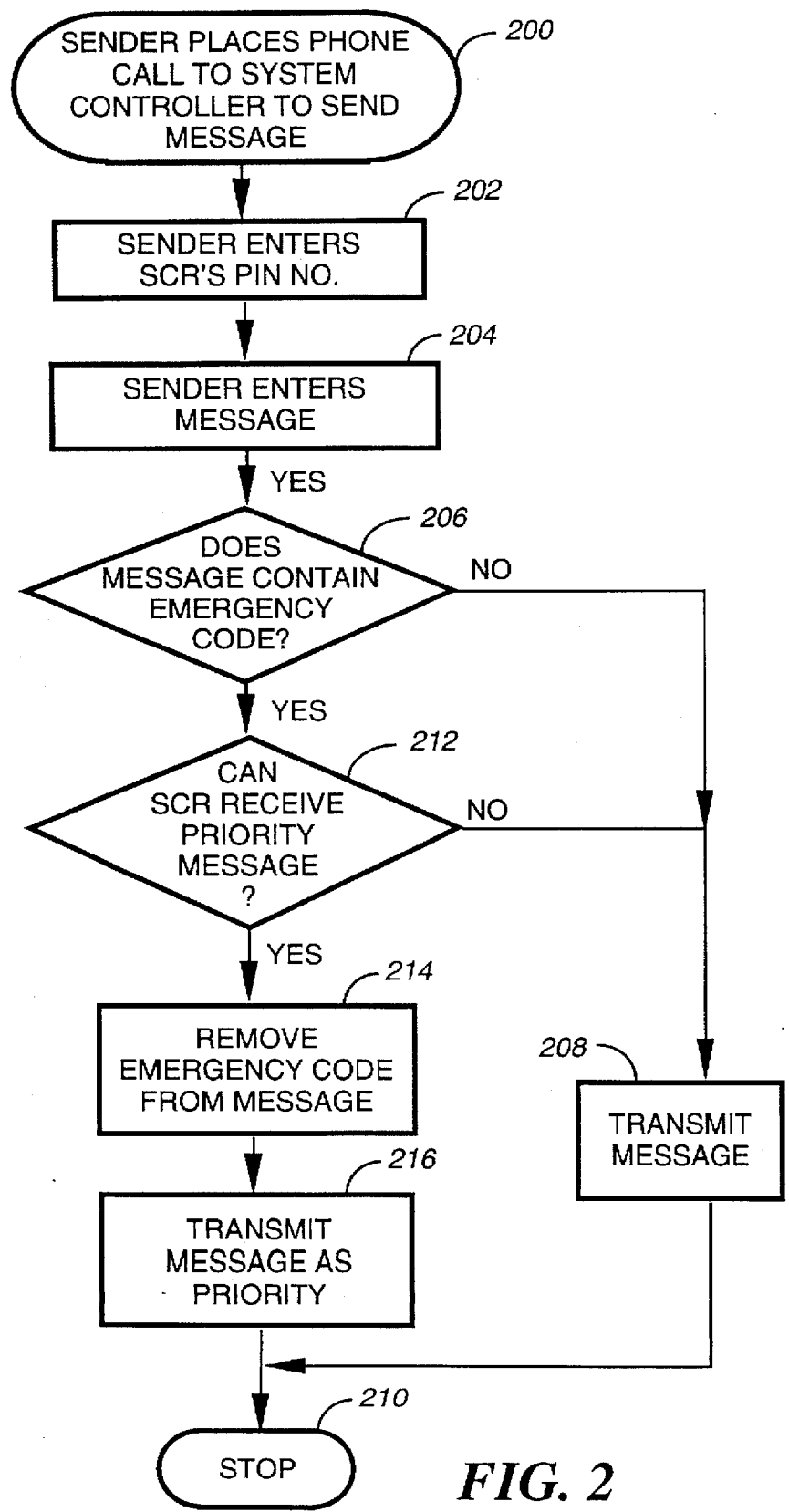
FIG. 2 is a flow chart illustrating the sequence of steps by which an emergency message is sent to a selective call receiver according to the invention.

The steps by which the present invention is preferably carried out are illustrated in FIG. 2, to which reference is now made. Starting at step 200, the message originator places a telephone call to the system controller 108 using the telephone 106. The system controller 108 has a conventional processor which is programmed to cause the system controller 108 to prompt the sender to enter a "pin" number which identifies the targeted selective call receiver (SCR). Per step 202, the sender enters the pin number and then, per step 204, enters the message to be sent. For example, the message being entered may include a telephone number followed by the emergency code "911".

The remaining steps in the flow chart of FIG. 2 illustrate how the system controller's processor is programmed to carry out the remaining steps involved in sending an emergency message. Per step 206, the system controller determines whether the message contains an emergency code. This can be accomplished, for example, by using conventional text matching techniques which compare the text of the message to a look-up table that contains the emergency code which is being looked for. If the message does not contain an emergency code, the program proceeds to step 208 whereby the base station 105 transmits the message as received from the sender. The program proceeds to step 210 which terminates this program.

Returning back to step 206, if the message received by the base station 105 does contain an emergency code, the program proceeds to step 212 where the base station's system controller determines whether the targeted selective call receiver is capable of receiving a priority message. That is, it determines whether the targeted selective call receiver has a code plug (or other storage device) which is programmed to cause the targeted selective call receiver to operate in the priority mode in response to an instruction from the base station 105 identifying the message as a priority message. As discussed earlier, the base station system controller 108 includes a look-up table which identifies each selective call receiver that is known to be able to operate in the priority mode. If the targeted selective call receiver is unable to receive a priority message, the program proceeds from step 212 to step 208 for transmitting the message as originally sent by the originator. If that original message did include the emergency code, then that message, along with the emergency code, is transmitted to the targeted selective call receiver.

If the selective call receiver was determined in step 212 as being able to receive a priority message (i.e., operate in the priority mode), the program proceeds from step 212 to step 214. At the latter step, the system controller removes the emergency code from the message and then, per step 216, transmits the shortened emergency message as a priority message.

As is discussed in more detail below, the shortened emergency message is transmitted as a priority message by transmitting alert instructions along with the transmitted message. When the transmitted message is received by the targeted selective call receiver, the selective call receiver displays the shortened emergency message and signifies that an emergency message has been received by generating a distinctive alert.

Figure 3:
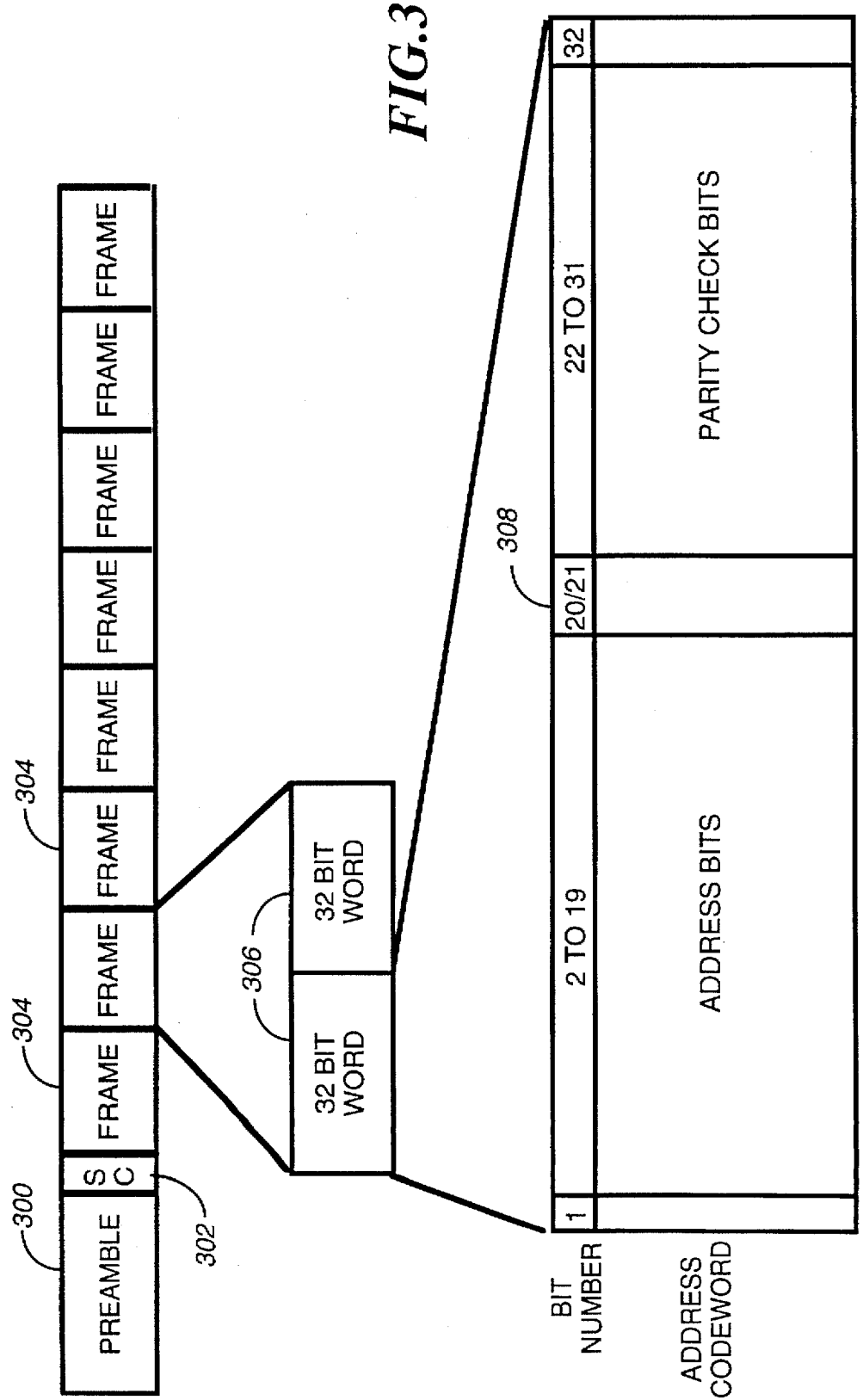
FIG. 3 shows the format of a first transmission protocol for transmitting emergency messages according to the invention.

The way in which the base station 105 indicates that it is sending a priority message depends on the protocol being used by the communication system. There are at least two existing protocols that may be used. One is the well known POCSAG protocol, and the other is the newer FLEX protocol (FLEX is a trademark of Motorola, Inc.). The way in which the invention is used with the POCSAG protocol will be explained first with reference to FIG. 3.

Each POCSAG transmission begins with a preamble 300 which permits the selective call receivers to obtain bit synchronization. The preamble is followed by a synchronization code word (SC) 302, and then eight frames 304, each of which contains two words 306 containing 32 bits. Each of the 32 bit words 306 comprises an address code word or a message code word in which bits 2 through 19 contain the address of the targeted selective call receiver, bits 20 and 21 are function bits 308 and bits 22–32 are parity check bits. It is the function bits 308 which constitute the alert instruction telling the targeted selective call receiver that the accompanying message is a priority message. The status of these bits 308 is set so that when they are decoded at the selective call receiver, the program in the selective call receiver's code plug 120 (FIG. 1) allows the decoder/controller 118 to determine that the message is a priority message.

Figure 4:
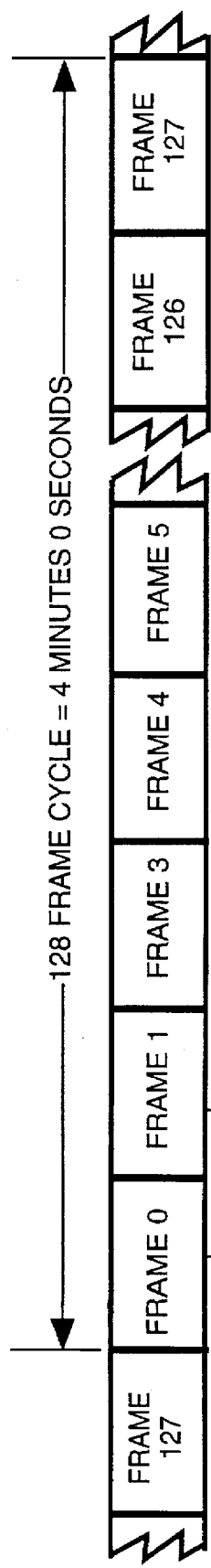
FIGS. 4 and 5 show the format of another transmission protocol for transmitting emergency messages according to the invention.
Figure 5:
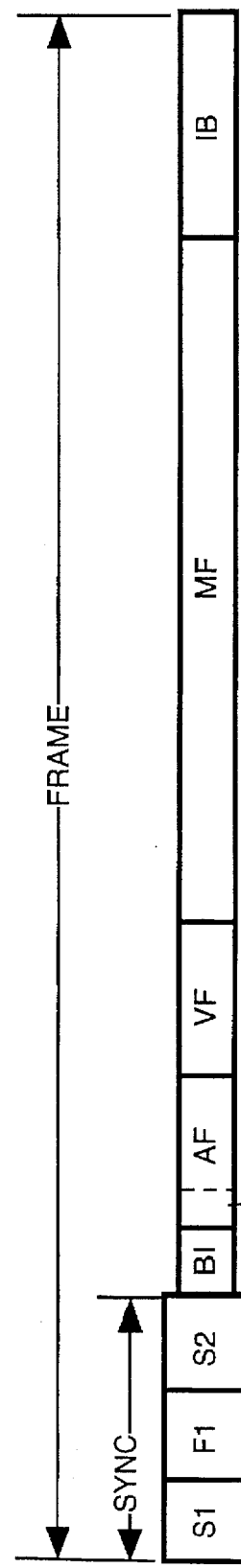

The way in which the invention is implemented with the FLEX protocol will now be described with references to FIGS. 4 and 5. According to the FLEX protocol, 128 frames 310 are transmitted in succession, numbered frame 0 through frame 127. The transmission of all 128 frames is referred to as a frame cycle which requires 4 minutes. As shown in FIG. 5, each frame begins with a synchronization portion (SYNC) which includes portions S1, F1 and S2. The S1 portion provides for frame timing, symbol timing and indicates the speed of the remainder of the frame. The F1 portion (frame information) carries information identifying the frame and cycle numbers, indicating whether time diversity is used, indicating phases of low traffic, and other information.

The S2 portion provides for synchronization at the frame block speed to allow for proper de-multiplexing and decoding of the blocks.

Following the synchronization portion is a block information (BI) field which contains frame and system structure information. Following that is an address field (AF) which contains addresses of targeted selective call receivers. A portion 312 of the address field (AF) includes up to 15 priority addresses. The priority addresses are used in the connection with the invention as will be described below.

Following the address field is a vector field (VF) which includes data which points to the start of an associated message. Also discussed in more detail below, the vector field provides an alternate location for including alert instructions for a targeted selective call receiver.

A message field (MF) follows the vector field and contains the message words (text) which are pointed to by the vectors in the vector field (VF). Following the message field, IB represents idle blocks which are unused and are filled with appropriate bit patterns.

When the invention is used with the FLEX protocol, the alert instructions can take the form of priority addresses that are sent in the portion 312 of the address field (AF). A priority address is an address of a selective call receiver that is known to be capable of operating in the priority mode. Such a conventional receiver typically has a priority address and a non-priority address. A priority address is used when the targeted selective call receiver is being sent an emergency message, and a non-priority address is used when the targeted selective call receiver is being sent a non-emergency message. By including a priority address in the address field, the targeted selective call receiver recognizes that it is receiving an emergency message, it displays the message, and it signifies the receipt of the emergency message by generating a distinctive alert.

An alternate way of sending an alert instruction using the FLEX protocol is to make use of the vector field shown in FIG. 5. A short instruction vector is included in this field to act as an alert instruction, and the selective call receiver's code plug is programmed to cause the decoder/controller 118 to recognize this vector as a command to go into the alert mode and treat the accompanying shortened emergency message as a priority message. Thus, with a shortened emergency message included in the message field and a instruction vector included in the vector field, the targeted selective call receiver will display the shortened emergency message and generate a distinctive alert.

By sending emergency messages as described above, the originator of the message can be assured that any recipient whose selective call receiver is capable of operating in the priority mode will be automatically alerted when an emergency message is received. No modification of the selective call receiver is required. Further, the base station is not required to encode and transmit any emergency code appended to a message, thus increasing channel capacity.

Although the invention has been described in terms of preferred embodiments, it will be obvious to those skilled in the art that many variations and alterations may be made without departing from the invention. Accordingly, it is intended all such alterations and variations be included within the spirit and scope of the invention as defined by the appended claims.

What is claimed is:

1. In an RF communication system having a base station that receives incoming messages for transmission to selective call receivers, a method for transmitting emergency messages to the selective call receivers, comprising:

at the base station:

a) receiving incoming messages that are to be transmitted to selective call receivers, wherein some of the incoming messages are emergency messages that include an emergency code;

b) removing the emergency code from the emergency messages to provide shortened emergency messages; and c) transmitting the shortened emergency messages along with alert instructions for activating a priority alert in selective call receivers that receive a shortened emergency message.

2. A method as set forth in claim 1 wherein the emergency code is 911.

3. A method as set forth in claim 1 further including, prior to step b), scanning each incoming message to detect the presence of an emergency code.

4. A method as set forth in claim 1 wherein each message is transmitted with an address code word identifying a selective call receiver to which a transmitted message is addressed, and wherein the alert instructions are appended to the address code word.

5. A method as set forth in claim 1 wherein messages are transmitted according to a protocol that includes an address field, and wherein an alert instruction comprises a priority address transmitted within the address field.

6. A method as set forth in claim 1 wherein messages are transmitted according to a protocol that includes a vector field, and wherein an alert instruction comprises data transmitted within the vector field.

7. In an RF communication system having a base station that receives incoming messages for transmission to selective call receivers, a method for transmitting emergency messages to the selective call receivers, comprising:

at the base station:

a) receiving incoming messages that are to be transmitted to selective call receivers, wherein some of the incoming messages are emergency messages that include "911";

b) scanning incoming messages to detect the presence of "911";

c) removing "911" from the emergency messages to provide shortened emergency messages; and d) transmitting the shortened emergency messages along with alert instructions for activating a priority alert in selective call receivers that receive a shortened emergency message.

* * * * *